(12) United States Patent
Kitamura et al.

(10) Patent No.: US 10,530,213 B2
(45) Date of Patent: Jan. 7, 2020

(54) STATOR UNIT, MOTOR, AND FAN MOTOR

(71) Applicant: Nidec Corporation, Kyoto (JP)

(72) Inventors: Yoshihisa Kitamura, Kyoto (JP); Takaya Okuno, Kyoto (JP); Hideki Aoi, Kyoto (JP); Shoki Yamazaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 43 days.

(21) Appl. No.: 15/921,701

(22) Filed: Mar. 15, 2018

(65) Prior Publication Data

US 2018/0278116 A1 Sep. 27, 2018

(30) Foreign Application Priority Data

Mar. 24, 2017 (JP) .................. 2017-059286

(51) Int. Cl.
*H02K 1/22* (2006.01)
*H02K 5/10* (2006.01)
(Continued)

(52) U.S. Cl.
CPC .............. *H02K 5/10* (2013.01); *F04D 25/062* (2013.01); *F04D 25/064* (2013.01); *F04D 25/0613* (2013.01); *F04D 25/0633* (2013.01); *F04D 25/0646* (2013.01); *F04D 25/08* (2013.01); *F04D 29/083* (2013.01); *H02K 1/187* (2013.01); *H02K 1/2786* (2013.01); *H02K 5/1735* (2013.01); *H02K 7/083* (2013.01); *H02K 7/14* (2013.01); *H02K 15/12* (2013.01); *H02K 21/22* (2013.01)

(58) Field of Classification Search
CPC ........ H02K 1/187; H02K 1/2786; H02K 1/22; H02K 5/10; H02K 5/1735
See application file for complete search history.

(56) References Cited

U.S. PATENT DOCUMENTS 3,436,569 A * 4/1969 Kimball, Jr. ............. H02K 1/16
 310/216.131
3,873,861 A * 3/1975 Halm ..................... H02K 1/185
 310/43
(Continued)

FOREIGN PATENT DOCUMENTS

CN 101902091 A 12/2010
CN 104113179 A 10/2014
(Continued)

*Primary Examiner* — Dang D Le
(74) *Attorney, Agent, or Firm* — Keating & Bennett (57) ABSTRACT

In a fan motor, a stator unit of a motor that rotates an impeller includes an annular stator, the center of which is positioned on a central axis, and a housing including an accommodating portion that accommodates a part of a resin portion covering at least a part of the stator. At least one of a bottom face of the accommodating portion oriented to the stator in the axial direction and an inner side face of the accommodating portion oriented to an inner side in the radial direction is provided with a plurality of stepped portions. The stepped portions are different from each other in length in the axial direction when provided in the bottom face, and/or in length in the radial direction when provided in the inner side face. The bottom face, the inner side face, and the stepped portion are covered with the resin portion.

14 Claims, 11 Drawing Sheets

(51) Int. Cl.
*H02K 1/18* (2006.01)
*H02K 1/27* (2006.01)
*H02K 7/08* (2006.01)
*F04D 25/08* (2006.01)
*F04D 25/06* (2006.01)
*H02K 7/14* (2006.01)
*H02K 15/12* (2006.01)
*H02K 21/22* (2006.01)
*H02K 5/173* (2006.01)
*F04D 29/08* (2006.01)

(56) References Cited

U.S. PATENT DOCUMENTS

| | | | | |
|---|---|---|---|---|
| 5,644,178 A | * | 7/1997 | Halm | ........ H02K 3/50 |
| | | | | 310/43 |
| 2004/0222712 A1 | * | 11/2004 | Hong | ........ H02K 5/08 |
| | | | | 310/67 R |
| 2010/0300779 A1 | | 12/2010 | Sagara et al. | |
| 2010/0301687 A1 | | 12/2010 | Nagao et al. | |
| 2014/0314596 A1 | | 10/2014 | Kudo et al. | |

FOREIGN PATENT DOCUMENTS

| | | |
|---|---|---|
| JP | 2001-320867 A | 11/2001 |
| JP | 2002-345199 A | 11/2002 |
| JP | 2003-111373 A | 4/2003 |
| JP | 2014-230363 A | 12/2014 |

* cited by examiner

STATOR UNIT, MOTOR, AND FAN MOTOR

CROSS REFERENCE TO RELATED APPLICATIONS

This application claims the benefit of priority to Japanese Patent Application No. 2017-059286 filed on Mar. 24, 2017. The entire contents of this application are hereby incorporated herein by reference.

BACKGROUND OF THE INVENTION

1. Field of the Invention

The present disclosure relates to a stator unit, a motor, and a fan motor.

2. Description of the Related Art

Heretofore, various efforts have been made for a motor to improve the water-proofing property of a stator. For example, a fan motor described in Japanese Unexamined Patent Application Publication No. 2003-111373 is a brushless motor including a stator in a layer integrally molded with silicone rubber injection in order to prevent entry of water into the stator.

However, although a stator is covered with a resin, there is still a risk that water may reach the stator through an interface between a housing that accommodates the resin covering the stator, and the resin, and cause various negative effects such as corrosion of a stator core.

SUMMARY OF THE INVENTION

To achieve the above-mentioned object, an exemplary stator unit of the present disclosure includes an annular stator, the center of which is positioned on a central axis, and a housing including an accommodating portion that accommodates a part of a resin portion covering at least a part of the stator. At least one of a bottom face of the accommodating portion oriented to the stator in the axial direction and an inner side face of the accommodating portion oriented inward in the radial direction is provided with a plurality of stepped portions. The stepped portions provided in the bottom face are different from each other in length in the axial direction. The stepped portions provided in the inner side face are different from each other in length in the radial direction. The bottom face, the inner side face, and the stepped portion are covered with the resin portion.

To achieve the above-mentioned object, an exemplary motor of the present disclosure includes a rotor that can rotate about a central axis, a stator unit including a stator that drives the rotor, and a bearing that is disposed in the stator unit and rotatably supports the rotor. The rotor has a magnet inside or outside of the stator in the radial direction.

To achieve the above-mentioned object, an exemplary fan motor of the present disclosure includes an impeller including a plurality of blades rotatable about a central axis, and above-mentioned motor that rotates the impeller.

The exemplary stator unit, motor, and fan motor of the present disclosure can improve the water-proofing property of the stator.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Exemplary embodiments of the present disclosure will be described below with reference to figures.

Figure 1:
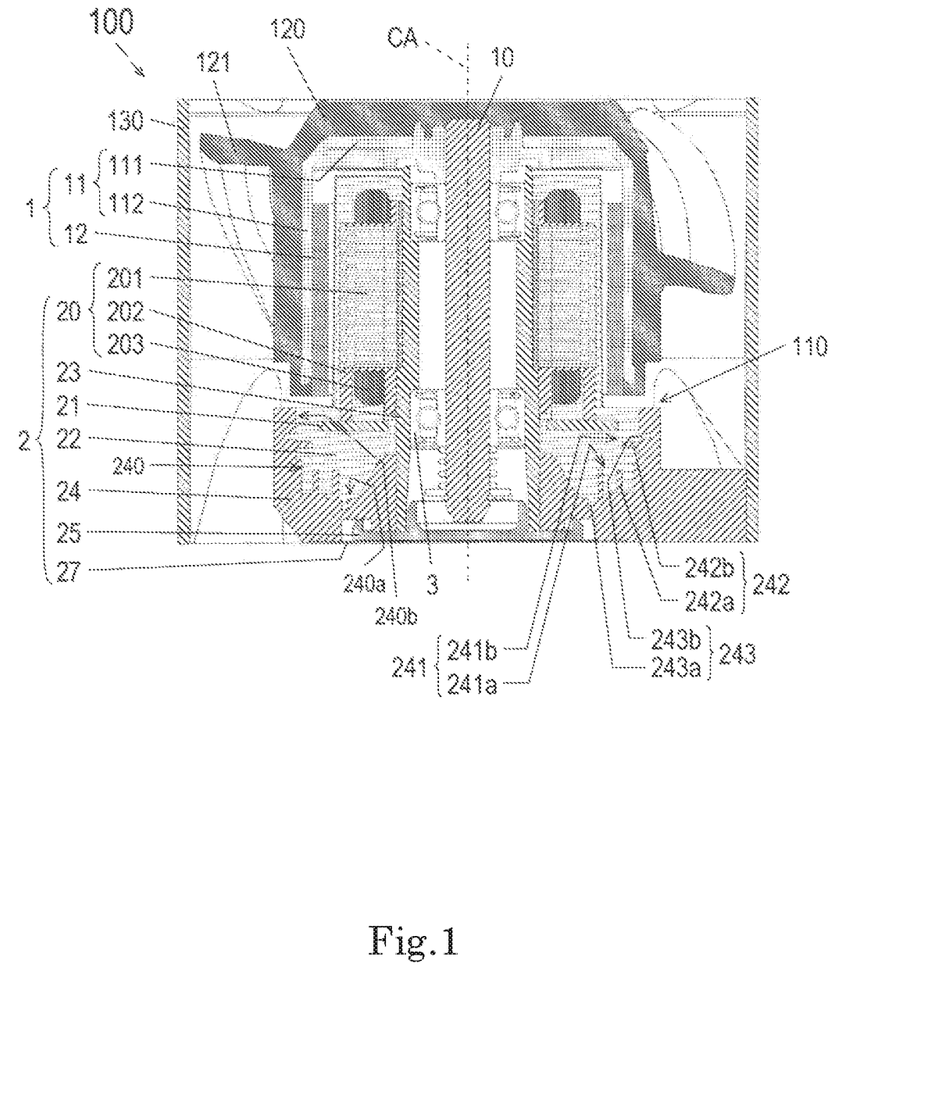
FIG. 1 is a sectional view illustrating a fan motor in accordance with an embodiment.

In this specification, in a fan motor 100, a direction that is parallel to a central axis CA is referred to as "axial direction". One side in the axial direction from a rotor 1 toward a stator unit 2 is referred to as "lower side". The other side in the axial direction from the stator unit 2 toward the rotor 1 is referred to as "upper side". In each constituent, an end on the lower side in the axial direction is referred to as "lower end", and an end on the upper side in the axial direction is referred to as "upper end". In faces of each constituent, the face oriented downward in the axial direction is referred to as "lower face", and the face oriented upward in the axial direction is referred to as "upper face".

A direction parallel to the central axis CA is referred to as "radial direction", and a direction encircling the central axis CA is referred to as "circumferential direction". In the radial direction, a side closer to the central axis CA is referred to as "inner side or inside", and a side farther from the central axis CA is referred to as "outer side or outside". In each constituent, an end on the inner side in the radial direction is referred to as "inner end", and an end on the outer side in the radial direction is referred to as "outer end". In side faces of each constituent, the side face oriented inward in the radial direction is referred to as "inner side face", and the side face oriented outward in the radial direction is referred to as "outer side face".

The above-mentioned directions, ends, and faces do not indicate positional relations and directions in the case where the constituents are actually incorporated into equipment.

FIG. 1 is a sectional view including the central axis CA of the fan motor 100 in accordance with an embodiment.

As illustrated in FIG. 1, the fan motor 100 includes a motor 110, an impeller 120, and a casing 130. The motor 110 is a drive device that rotates the impeller 120. The impeller 120 is a vane wheel attached to the upper portion of the motor 110 in the axial direction, and has a plurality of blades 121 capable of rotating about the central axis CA. The impeller 120 can be rotated about the central axis CA by the motor 110, generating an air current flowing in the axial direction. The casing 130 accommodates the motor 110 and the impeller 120, and holds the motor 110.

Next, the configuration of the motor 110 will be described. As illustrated in FIG. 1, the motor 110 includes a shaft 10, the rotor 1 that can rotate about the central axis CA, the stator unit 2 that drives the rotor 1, and a bearing 3 that rotatably supports the rotor 1.

The shaft 10 is a rotational shaft attached to the rotor 1, and can rotate about the central axis CA along with the rotor 1. The shaft 10 is not limited to such rotational shaft, and may be a fixed shaft attached to the stator unit 2. When the shaft 10 is the fixed shaft, the rotor 1 is provided with a bearing (not illustrated) that rotatably supports the shaft 10.

The rotor 1 has a rotor holding member 11 and a magnet 12. The rotor holding member 11 is a member that holds the magnet 12. The rotor holding member 11 has a disc portion 111 and a cylindrical portion 112. The disc portion 111 is a ring-shaped member that extends from the central axis CA outward in the radial direction. The cylindrical portion 112 is a cylindrical member that extends from the periphery of the disc portion 111 downward in the axial direction. The magnet 12 is located outside of the stator 20 of the stator unit 2 in the radial direction. The magnet 12 is held on the inner side face of the cylindrical portion 112, and is opposed to the outer side face of the stator 20.

The stator unit 2 has the annular stator 20 about the central axis CA, a base plate 21, a resin portion 22, a bearing holder 23, a housing 24, a cover 25, and a film 27.

The stator 20 has a stator core 201, an insulator 202, and a plurality of coils 203. The stator core 201 is an iron core member including a stacked steel plate formed by stacking electromagnetic steel plates in the axial direction. The insulator 202 is an insulating member made of, for example, a resin material, and covers at least a part of the stator core 201. Conducting wires of the plurality of coils 203 are wound around the stator core 201 via the insulator 202.

The base plate 21 is electrically connected to conducting wires of the plurality of coils 203. Further, the base plate 21 is also electrically connected to a lead wire drawn to the outside (not illustrated). The base plate 21 is provided between the stator 20 and a bottom face 240a of a below-mentioned accommodating portion 240 of the housing 24 in the axial direction. The base plate 21 is located inside of the accommodating portion 240, and is covered with a resin portion 22. Thereby, the resin portion 22 filled in the accommodating portion 240 can cover the base plate 21. Accordingly, environmental resistance of the base plate 21 can be ensured.

The resin portion 22 covers at least a part of the stator 20. More specifically, the resin portion 22 covers the stator 20, the base plate 21, and the outer side face of the bearing holder 23, and fills the accommodating portion 240 of the housing 24.

The bearing holder 23 is a cylindrical member that holds the stator 20 and the bearing 3. The bearing 3 is disposed in the bearing holder 23, and the shaft 10 is inserted thereinto. The stator 20 is fixed to the outer side of the bearing holder 23 in the radial direction.

The housing 24 holds the outer side face of the bearing holder 23 on the lower side in the axial direction. The housing 24 is fixed to the casing 130. The motor 110 is held by the casing 130 via the housing 24. The housing 24 has the accommodating portion 240 that accommodates a part of the resin portion 22. The bottom face 240a and an inner side face 240b of the accommodating portion 240 are covered with the resin portion 22. The bottom face 240a is a face of the accommodating portion 240 oriented to the stator 20 (that is, upward) in the axial direction. The inner side face 240b is a face of the accommodating portion 240 oriented inward in the radial direction. The bottom face 240a and the inner side face 240b are covered with the resin portion 22. Further, the bottom face 240a and the inner side face 240b of the accommodating portion 240 are provided with a plurality of stepped portions 241. The stepped portions 241 are located closer to the bottom face 240a in the axial direction than the base plate 21 is (that is, below the base plate 21). Thus, the stepped portions 241, and a protrusion portion 242 and a dent portion 243, which are formed of the stepped portions 241, can be prevented from hitting against the base plate 21. The configuration of the stepped portions 241 will be described later.

A cover 25 is fitted into the lower end of the bearing holder 23 on the lower side in the axial direction. The cover 25 covers the lower end of the bearing holder 23 on the lower side in the axial direction, and at least a part of the lower end of the housing 24 in the axial direction.

A film 27 is stuck to lower faces of the housing 24 and the cover 25. The film 27 covers a part of the lower face of the housing 24 and at least a part of the cover 25 when viewed in the axial direction.

The bearing 3 is disposed in the stator unit 2, and rotatably supports the rotor 1. More specifically, the bearing 3 is held by the bearing holder 23 of the stator unit 2, and rotatably supports the shaft 10 extending in the axial direction. The bearing 3 is a ball bearing in this embodiment. However, the bearing 3 is not limited to the ball bearing, and may be a sleeve bearing, for example.

The configuration of the stepped portions 241 will be described below. At least one of the bottom face 240a and the inner side face 240b of the accommodating portion 240 is provided with a plurality of stepped portions 241. The stepped portions 241a provided in the bottom face 240a are different from each other in length in the axial direction, and each include a face oriented in the axial direction and faces oriented in the radial direction. The stepped portions 241b provided in the inner side face 240b are different from each other in length in the radial direction, and each include faces oriented in the axial direction and a face oriented in the radial direction. The bottom face 240a, the inner side face 240b, and the stepped portions 241 are covered with the resin portion 22. More specifically, the faces oriented upward in the axial direction and the faces oriented in the radial direction of the stepped portions 241 are covered with the resin portion 22. This can increase the contact area between the accommodating portion 240 of the housing 24 and the resin portion 22. Accordingly, adhesiveness of the resin portion 22 to the accommodating portion 240 can be improved, which makes moisture less likely to intrude into between the resin portion 22 and the housing 24 (accommodating portion 240). Further, it is possible to increase the distance with which moisture intrudes through the interface between the accommodating portion 240 of the housing 24 and the resin portion 22 filled in the accommodating portion 240 reaches the stator 20. Accordingly, moisture is less likely to intrude into the stator 20, which can inhibit corrosion of the stator core 201 and so forth. Therefore, the water-proofing property of the stator 20 can be improved.

Figure 2:
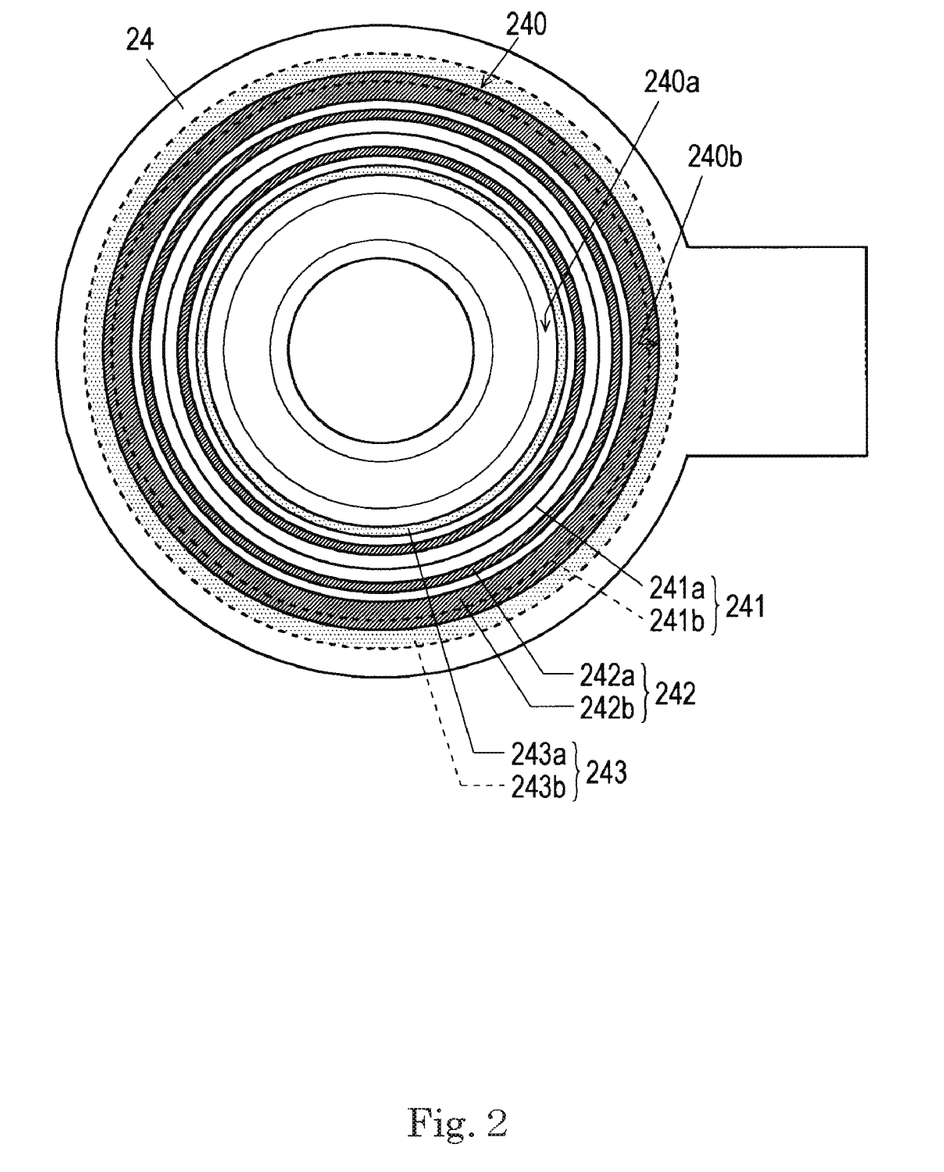
FIG. 2 is a top view illustrating a housing in accordance with the embodiment.

As illustrated in FIG. 2, the stepped portions 241 each are continuous annularly in the circumferential direction. Accordingly, the configuration of the accommodating portion 240 provided with the stepped portions 241 can be easily designed. In addition, the accommodating portion 240 can be molded without using a mold of complicated shape. The annular stepped portions 241 when viewed in the axial direction may be arranged with their centers positioned on the central axis CA as illustrated in FIGS. 1 and 2 or on any axis offset from the central axis CA.

The plurality of stepped portions 241 include a plurality of first stepped portions 241a provided on the bottom face 240a of the accommodating portion 240 and arranged in the radial direction, and a plurality of second stepped portions 241b provided on the inner side face 240b of the accommodating portion 240 and arranged in the axial direction.

The first stepped portion 241a includes two upper faces oriented upward in the axial direction and a side face oriented inward or outward in the radial direction. The two upper faces are different from each other in the position in the axial direction. A radial inner end of one first upper face of the two upper faces is located inside of a radial inner end of the other second upper face in the radial direction. The side face of the first stepped portion 241a connects a radial outer end of the first upper face to the radial inner end of the second upper face.

The second stepped portion 241b includes two side faces oriented inward in the radial direction, and an upper face oriented upward in the axial direction or a lower face oriented downward in the axial direction. The two side faces are different from each other in the position in the radial direction. An axial upper end of one first side face of the two side faces is located above the axial upper end of the other second side face in the axial direction. The upper face or the lower face of the second stepped portion 241b connects the axial lower end of the first side face to the axial upper end of the second side face.

The plurality of stepped portions 241 form protrusion portions 242 and dent portions 243. The plurality of first stepped portions 241a form a first protrusion portion 242a and a first dent portion 243a. The plurality of second stepped portions 241b form a second protrusion portion 242b and a second dent portion 243b. The protrusion portion 242 includes a first protrusion portion 242a and a second protrusion portion 242b. The dent portion 243 includes the first dent portion 243a and the second dent portion 243b. The first protrusion portion 242a is provided on the bottom face 240a, and protrudes from the bottom face 240a upward in the axial direction. The second protrusion portion 242b is provided on the inner side face 240b, and protrudes from the inner side face 240b inward in the radial direction. The first dent portion 243a is provided on the bottom face 240a, and is dented from the bottom face 240a downward in the axial direction. The second dent portion 243b is provided on the inner side face 240b, and is dented from the inner side face 240b outward in the radial direction. The first protrusion portion 242a, the first dent portion 243a, the second protrusion portion 242b, and the second dent portion 243b are all covered with the resin portion 22. With such configuration, the contact area between the accommodating portion 240 and the resin portion 22 can be increased, and the distance with which moisture intrudes through the interface between the resin portion 22 and the accommodating portion 240 can be increased. This makes moisture less likely to intrude into the stator 20.

Figure 3A:
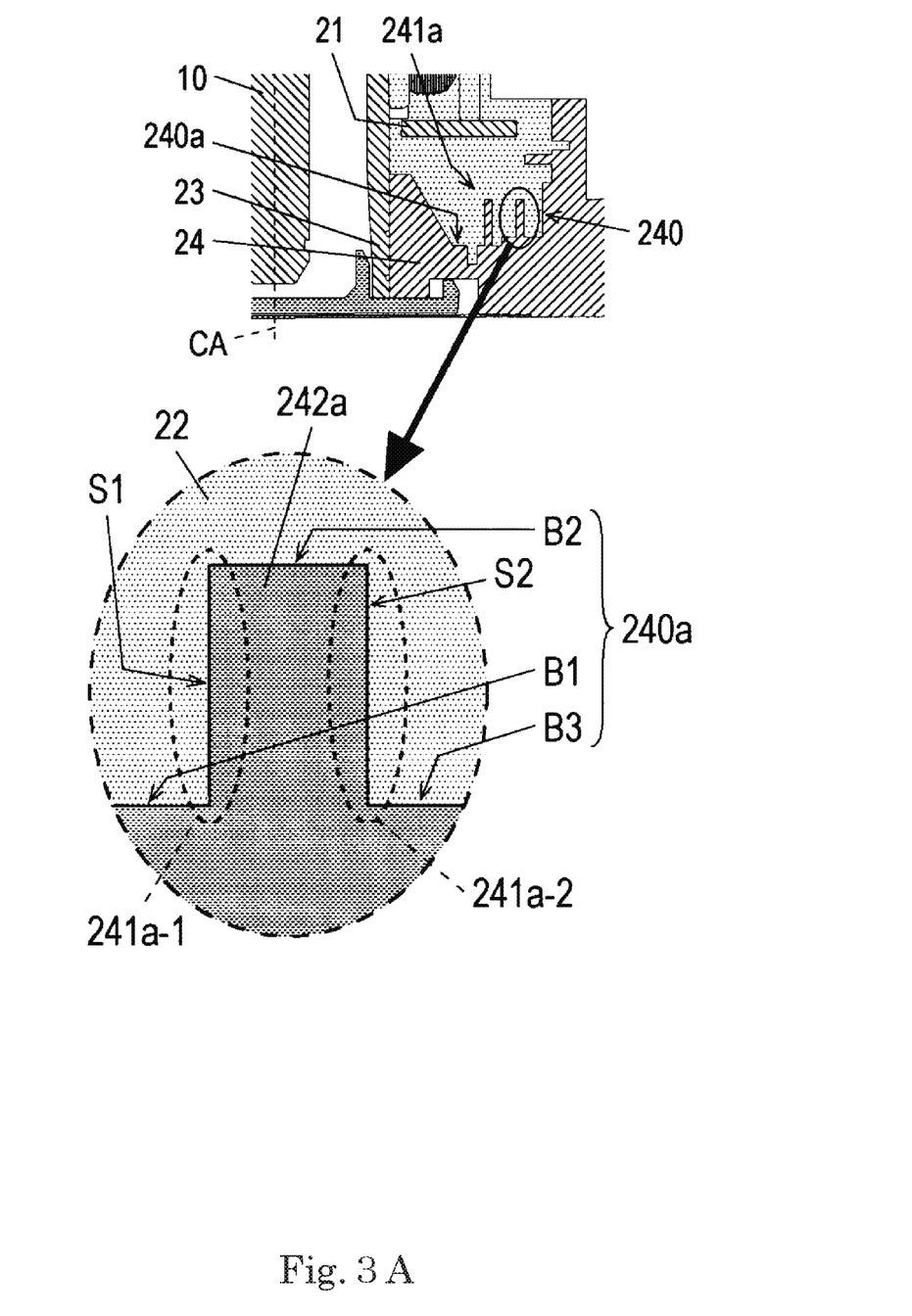
FIG. 3A is a sectional view illustrating an example of the configuration of a first protrusion portion when viewed in the circumferential direction.
Figure 3B:
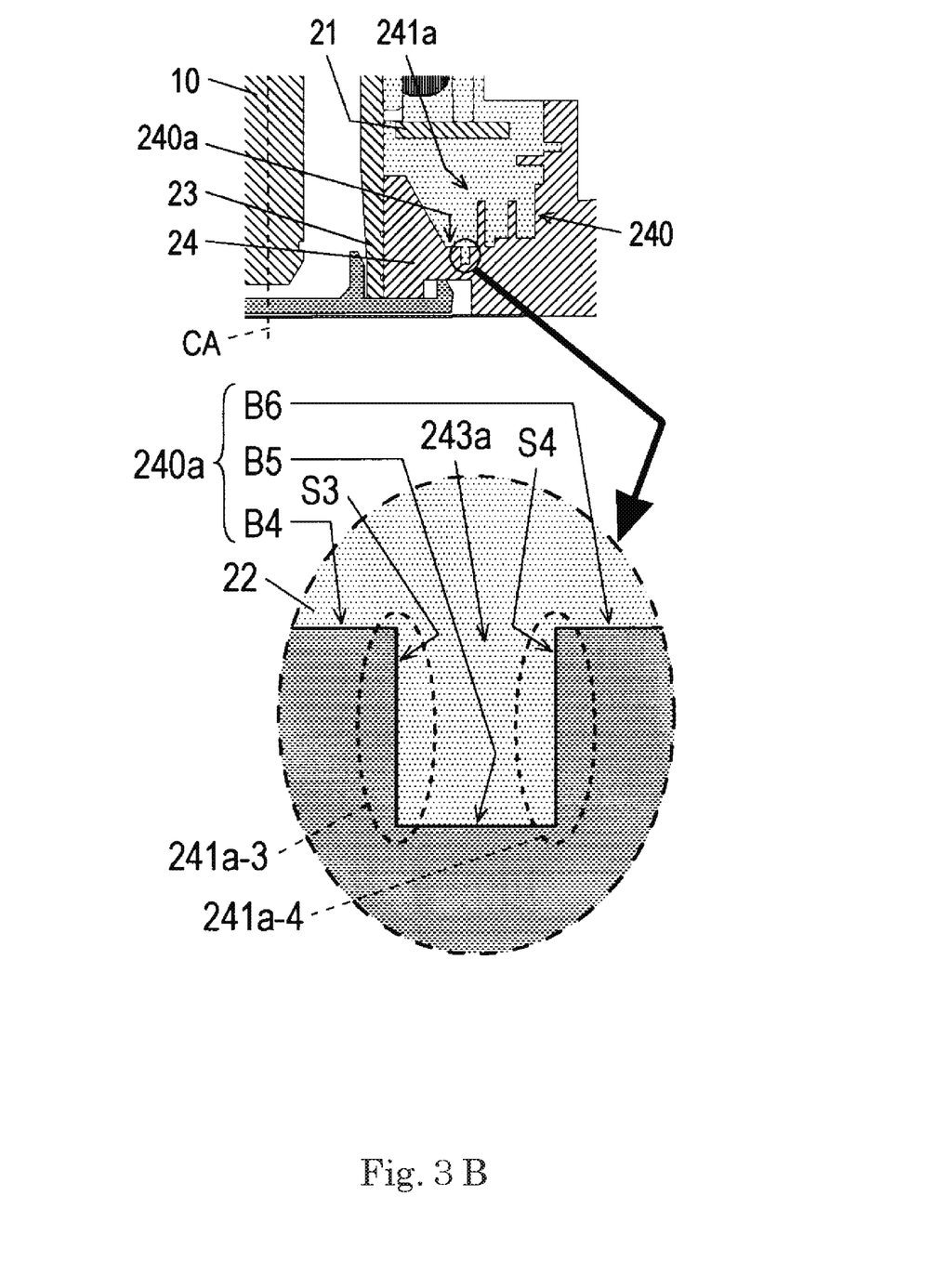
FIG. 3B is a sectional view illustrating an example of the configuration of a first dent portion when viewed in the circumferential direction.

The first protrusion portion 242a and the first dent portion 243a each are formed of at least two first stepped portions 241a. FIG. 3A is a sectional view illustrating an example of the first protrusion portion 242a when viewed in the circumferential direction. FIG. 3B is a sectional view illustrating an example of the first dent portion 243a when viewed in the circumferential direction. In FIGS. 3A and 3B, below-mentioned first to sixth bottom faces B1 to B6 each are a part of the bottom face 240a of the accommodating portion 240.

For example, when the first protrusion portion 242a is formed of the two first stepped portions 241a-1, 241a-2, one first stepped portion 241a-1 is adjacent to the other first stepped portions 241a-2 on the inner side in the radial direction. The one first stepped portion 241a-1 includes the first bottom face B1 oriented upward in the axial direction, the second bottom face B2 that is oriented upward in the axial direction and is located above the first bottom face B1 in the axial direction, and a first side face S1 oriented inward in the radial direction. A radial outer end of the first bottom face B1 is located inside of a radial outer end of the second bottom face B2 in the radial direction. The first side face S1 connects the radial outer end of the first bottom face B1 to a radial inner end of the second bottom face B2. The other first stepped portions 241a-2 includes the second bottom face B2, the third bottom face B3 that is oriented upward in the axial direction and is located below the second bottom face B2 in the lower side in the axial direction, and a second side face S2 oriented outward in the radial direction. A radial inner end of the third bottom face B3 is located outside of a radial inner end of the second bottom face B2 in the radial direction. The second side face S2 connects a radial outer end of the second bottom face B2 to the radial inner end of the third bottom face B3.

For example, when the first dent portion 243a is formed of the two first stepped portions 241a-3, 241a-4, one first stepped portion 241a-3 is adjacent to and radially inside of the other first stepped portions 241a-4. The one first stepped portions 241a-3 includes the fourth bottom face B4 oriented upward in the axial direction, the fifth bottom face B5 that is oriented upward in the axial direction and is located below the fourth bottom face B4 in the axial direction, and a third side face S3 oriented outward in the radial direction. A radial outer end of the fourth bottom face B4 is located radially inside of the radial outer end of the fifth bottom face B5. The third side face S3 connects the radial outer end of the fourth bottom face B4 to the radial inner end of the fifth bottom face B5. The other first stepped portions 241a-4 includes the fifth bottom face B5, the sixth bottom face B6 that is oriented upward in the axial direction and is located above the fifth bottom face B5 in the axial direction, and a fourth side face S4 oriented inward in the radial direction. The radial inner end of the fifth bottom face B5 is located radially inside of a radial inner end of the sixth bottom face B6. The fourth side face S4 connects the radial outer end of the fifth bottom face B5 to the radial inner end of the sixth bottom face B6.

The first protrusion portion 242a and the first dent portion 243a are larger in the axial direction than in the radial direction. More specifically, the first protrusion portion 242a that protrudes from the bottom face 240a upward in the axial direction is larger in the axial direction than in the radial direction. More specifically, for example, in the first protrusion portion 242a in FIG. 3A, the length from the first bottom face B1 or the third bottom face B3 to the second bottom face B2 in the axial direction (that is, the minimum distance in the axial direction) is larger than the width between the first side face S1 and the second side face S2 (that is, the minimum distance in the radial direction).

More specifically, the first dent portion 243a dented from the bottom face 240a downward in the axial direction is larger in the axial direction than in the radial direction. More specifically, for example, in the first dent portion 243a in FIG. 3B, the depth from the fourth bottom face B4 or the sixth bottom face B6 to the fifth bottom face B5 in the axial direction (that is, the minimum distance in the axial direction) is larger than the width between the first side face S1 and the second side face S2 (that is, the minimum distance in the radial direction).

In this manner, a larger number of first protrusion portions 242a and first dent portions 243a that can increase the contact area and the water-intrusion distance between the resin portion 22 and the accommodating portion 240 can be provided on the bottom face 240a. Accordingly, adhesiveness between the resin portion 22 and the accommodating portion 240, and the water-proofing property of the stator unit 2 can be further improved.

In the first protrusion portion 242a in FIG. 3A and the first dent portion 243a in FIG. 3B, the first to fourth side faces S1 to S4 are all parallel to the axial direction. In other words, the radial side faces of the first stepped portions 241a are parallel to the central axis CA. Thus, the accommodating portion 240 provided with the first stepped portions 241a can be easily shaped, for example, using a mold. The configuration in which the widths of the first protrusion portion 242a and the first dent portion 243a in the radial direction is constant when viewed in the axial direction can suppress a force radially applied between the first stepped portions 241a and the resin portion 22 filled in the accommodating portion 240 due to thermal shrinkage, thereby inhibiting or preventing generation of a gap in the radial direction.

Figure 4A:
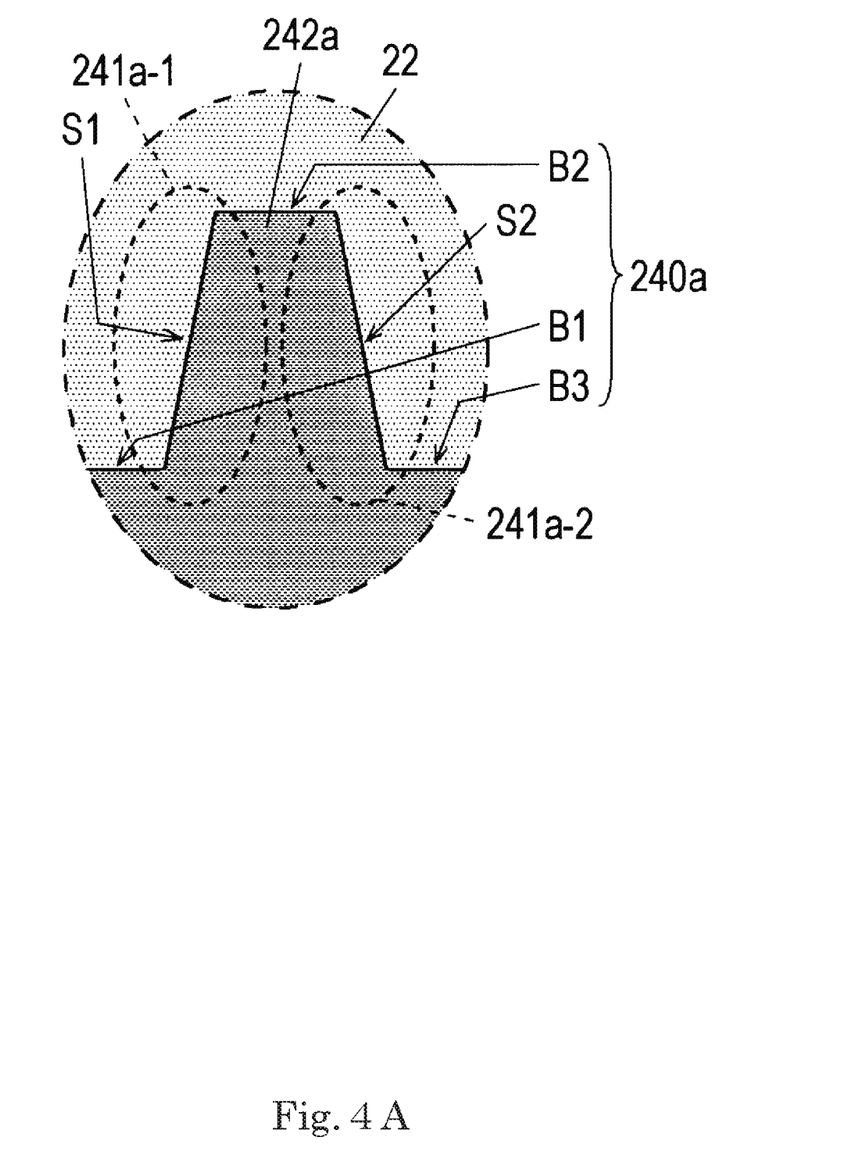
FIG. 4A is a sectional view illustrating a first modification example of the first protrusion portion when viewed in the circumferential direction.
Figure 4B:
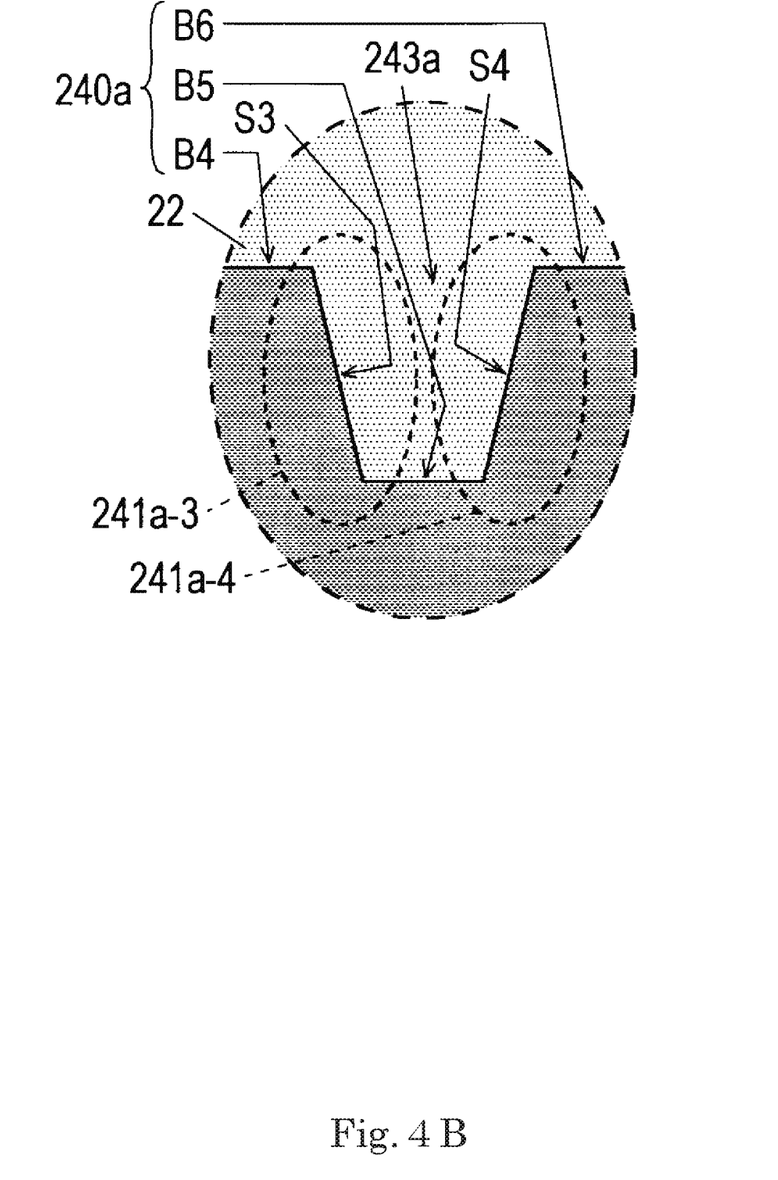
FIG. 4B is a sectional view illustrating a first modification example of the first dent portion when viewed in the circumferential direction.
Figure 5A:
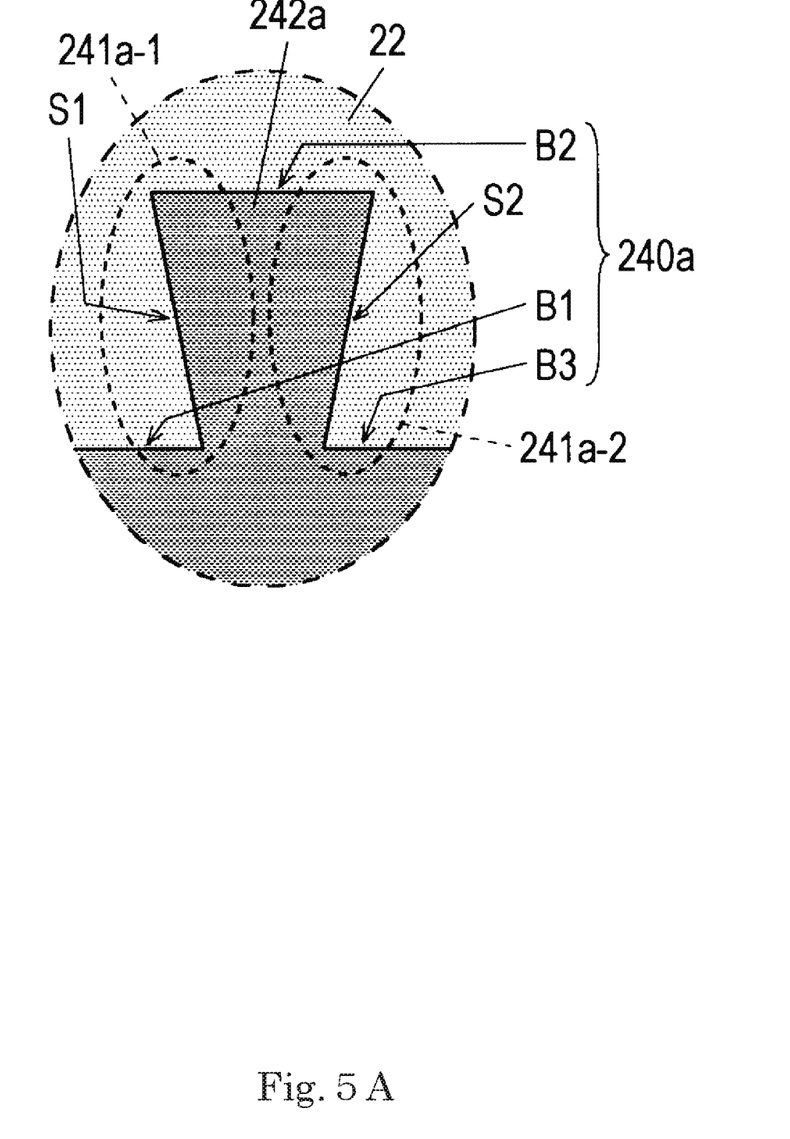
FIG. 5A is a sectional view illustrating a second modification example of the first protrusion portion when viewed in the circumferential direction.
Figure 5B:
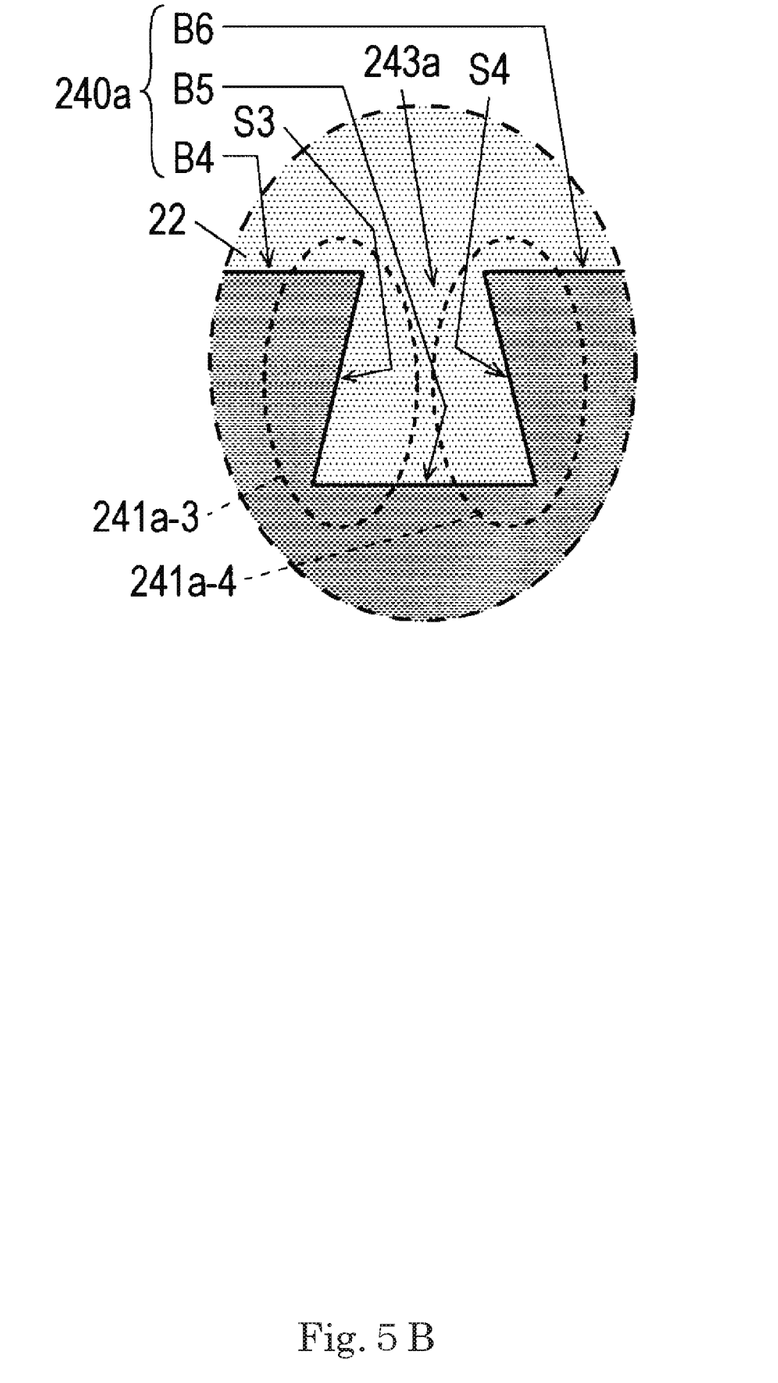
FIG. 5B is a sectional view illustrating a second modification example of the first dent portion when viewed in the circumferential direction.

The present invention is not limited to the embodiment illustrated in FIGS. 3A and 3B, and in the first protrusion portion 242a and the first dent portion 243a, the first to fourth side faces S1 to S4 may cross the axial direction. In other words, the radial side faces of the first stepped portions 241a may cross the axial direction, that is, may be inclined relative to the central axis CA. FIG. 4A is a sectional view illustrating a first modification example of the configuration of the first protrusion portion 242a when viewed in the circumferential direction. FIG. 4B is a sectional view illustrating the first modification example of the configuration of the first dent portion 243a when viewed in the circumferential direction. FIG. 5A is a sectional view illustrating a second modification example of the configuration of the first protrusion portion 242a when viewed in the circumferential direction. FIG. 5B is a sectional view illustrating the second modification example of the configuration of the first dent portion 243a when viewed in the circumferential direction. The same constituents in FIGS. 4A to 5B as those in FIGS. 3A and 3B are given the same reference numerals. The axial direction and the radial direction in FIGS. 4A to 5B are the same as those in FIGS. 3A and 3B.

For example, in the cross section of the first protrusion portion 242a when viewed in the circumferential direction, as illustrated in FIG. 4A, an axial upper end of the first side face S1 may be located outside of an axial lower end of the first side face S1 in the radial direction, and an axial upper end of the second side face S2 may be located inside of an axial lower end of the second side face S2 in the radial direction. In this case, the width of the second bottom face B2 in the radial direction is smaller than the distance between the radial outer end of the first bottom face B1 and the radial inner end of the third bottom face B3 (that is, the minimum distance in the radial direction).

In the cross section of the first dent portion 243a when viewed in the circumferential direction, as illustrated in FIG. 4B, an axial lower end of the third side face S3 is located outside of an axial upper end of the third side face S3 in the radial direction, and an axial lower end of the fourth side face S4 is located inside of an axial upper end of the fourth side face S4 in the radial direction. In this case, the width of the fifth bottom face B5 in the radial direction is smaller than the distance between the radial outer end of the fourth bottom face B4 and the radial inner end of the sixth bottom face B6 (that is, the minimum distance in the radial direction).

With the configuration as illustrated in FIGS. 4A and 4B, in molding the accommodating portion 240, a mold can be easily pulled out in the axial direction. Accordingly, the accommodating portion 240 can be easily shaped using a mold.

For example, in the cross section of the first protrusion portion 242a when viewed in the circumferential direction, as illustrated in FIG. 5A, the axial upper end of the first side face S1 may be located inside of the axial lower end of the first side face S1 in the radial direction, and the axial upper end of the second side face S2 may be located outside of the axial lower end of the second side face S2 in the radial direction. In this case, the width of the second bottom face B2 in the radial direction is larger than the distance between the radial outer end of the first bottom face B1 and the radial inner end of the third bottom face B3 (that is, the minimum distance in the radial direction).

In the cross section of the first dent portion 243a when viewed in the circumferential direction, as illustrated in FIG. 5B, the axial lower end of the third side face S3 may be located inside of the axial upper end of the third side face S3 in the radial direction, and the axial lower end of the fourth side face S4 may be located outside of the axial upper end of the fourth side face S4 in the radial direction. In this case, the width of the fifth bottom face B5 in the radial direction is larger than the distance between the radial outer end of the fourth bottom face B4 and the radial inner end of the sixth bottom face B6 (that is, the minimum distance in the radial direction).

With the configuration as illustrated in FIGS. 5A and 5B, the resin portion 22 covers the first protrusion portion 242a and the first dent portion 243a, thereby generating the anchor effect of making it more difficult to separate the resin portion 22 from the bottom face 240a. Accordingly, adhesiveness between the resin portion 22 and the accommodating portion 240 can be further improved.

Figure 6A:
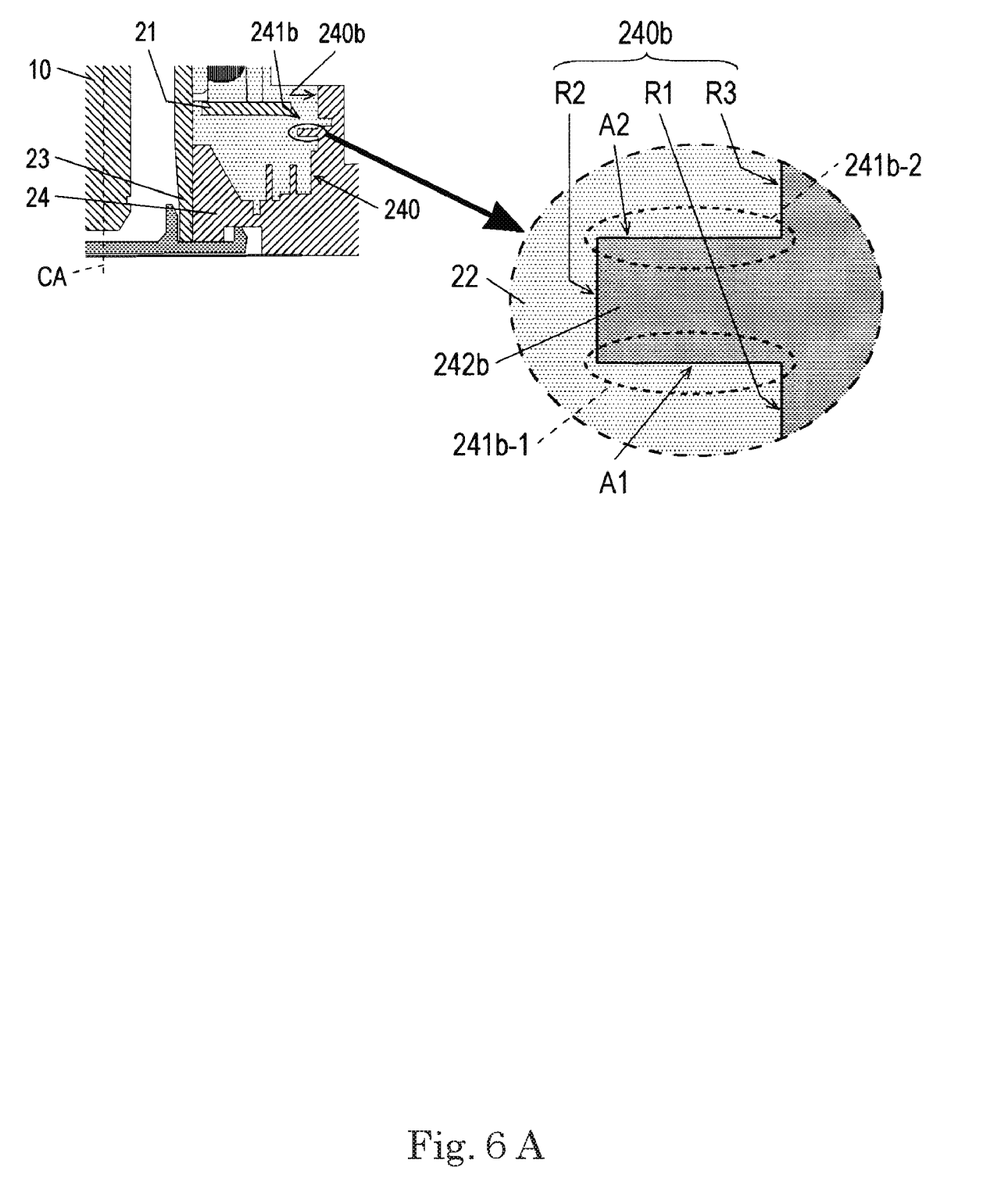
FIG. 6A is a sectional view illustrating an example of the configuration of a second protrusion portion when viewed in the circumferential direction.
Figure 6B:
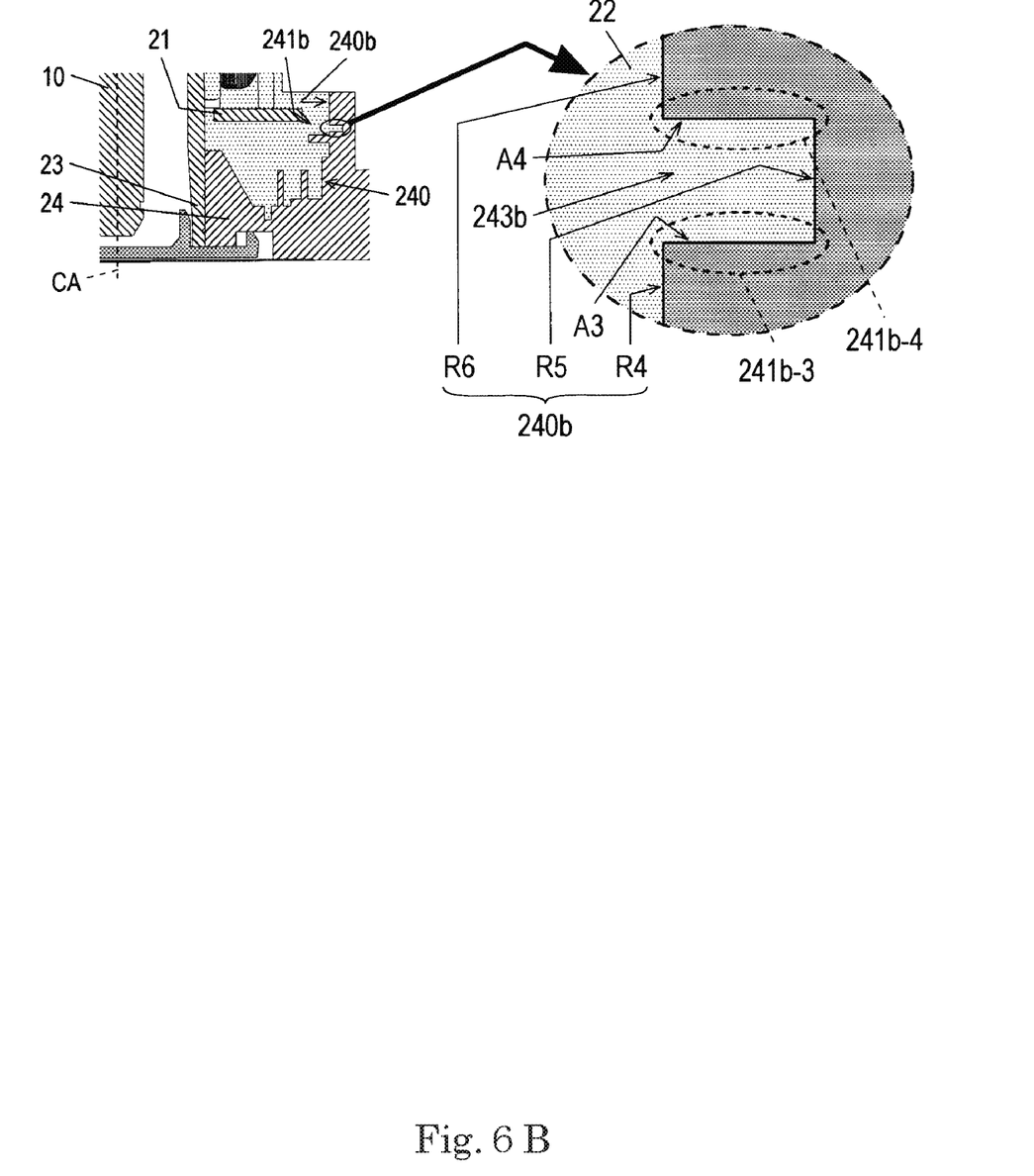
FIG. 6B is a sectional view illustrating an example of the configuration of a second dent portion when viewed in the circumferential direction.

The second protrusion portion 242b and the second dent portion 243b each are formed of at least two second stepped portions 241b. FIG. 6A is a sectional view illustrating an example of the configuration of the second protrusion portion 242b when viewed in the circumferential direction. FIG. 6B is a sectional view illustrating an example of the configuration of the second dent portion 243b when viewed in the circumferential direction. In FIGS. 6A and 6B, below-mentioned first to sixth inner side faces R1 to R6 each are a part of the inner side face 240b of the accommodating portion 240.

For example, when the second protrusion portion 242b is formed of the two second stepped portions 241b-1, 241b-2, one second stepped portions 241b-1 is adjacent to and axially below the other second stepped portion 241b-2 in the cross section of the second protrusion portion 242*b* when viewed in the circumferential direction, as illustrated in FIG. 6A. The one second stepped portions 241*b*-1 includes the first inner side face R1 oriented inward in the radial direction, the second inner side face R2 that is oriented inward in the radial direction and is located inside of the first inner side face R1 in the radial direction, and a first lower face A1 oriented downward in the axial direction. An axial upper end of the first inner side face R1 is below an axial upper end of the second inner side face R2 in the radial direction. The first lower face A1 connects the axial upper end of the first inner side face R1 to the axial lower end of the second inner side face R2. The other second stepped portions 241*b*-2 includes the second inner side face R2, the third inner side face R3 that is oriented inward in the radial direction and is located outside of the second inner side face R2 in the radial direction, and a first upper face A2 oriented upward in the axial direction. An axial lower end of the third inner side face R3 is located above an axial lower end of the second inner side face R2 in the axial direction. The first upper face A2 connects the axial upper end of the second inner side face R2 to the axial lower end of the third inner side face R3.

For example, when the second dent portion 243*b* is formed of the two second stepped portions 241*b*-3, 241*b*-4, one second stepped portion 241*b*-3 is adjacent to and axially below the other second stepped portion 241*b*-4 in the cross section of the second dent portion 243*b* when viewed in the circumferential direction, as illustrated in FIG. 6B. One second stepped portions 241*b*-3 includes the fourth inner side face R4 oriented inward in the radial direction, the fifth inner side face R5 that is oriented inward in the radial direction and is located outside of the fourth inner side face R4 in the radial direction, and a second upper face A3 oriented upward in the axial direction. An axial upper end of the fourth inner side face R4 is located below an axial upper end of the fifth inner side face R5 in the axial direction. The second upper face A3 connects the axial upper end of the fourth inner side face R4 to the axial lower end of the fifth inner side face R5. The other second stepped portion 241*b*-4 includes the fifth inner side face R5, the sixth inner side face R6 that is oriented inward in the radial direction and is located inside of the fifth inner side face R5 in the radial direction, and a second lower face A4 oriented downward in the axial direction. An axial lower end of the fifth inner side face R5 is located below an axial lower end of the sixth inner side face R6 in the axial direction. The second lower face A4 connects the radial upper end of the fifth inner side face R5 to the axial lower end of the sixth inner side face R6.

The second protrusion portion 242*b* and the second dent portion 243*b* are larger in the radial direction than in the axial direction. More specifically, the second protrusion portion 242*b* that protrudes from the inner side face 240*b* inward in the radial direction is larger in the radial direction than in the axial direction. More specifically, for example, in the second protrusion portion 242*b* in FIG. 6A, the length from the first inner side face R1 or the third inner side face R3 to the second inner side face R2 in the radial direction (that is, the minimum distance in the radial direction) is larger than the width between the first lower face A1 and the first upper face A2 (that is, the minimum distance in the axial direction).

The second dent portion 243*b* dented from the inner side face 240*b* outward in the radial direction is larger in the radial direction than in the axial direction. More specifically, for example, in the second dent portion 243*b* in FIG. 6B, the depth from fourth inner side face R4 or the sixth inner side face R6 to the fifth inner side face R5 in the radial direction (that is, the minimum distance in the radial direction) is larger than the width between the second upper face A3 and the second lower face A4 (that is, the minimum distance in the axial direction).

In this manner, more second protrusion portion 242*b* and second dent portion 243*b* that can increase the contact area and the water-intrusion distance between the resin portion 22 and the accommodating portion 240 can be provided on the inner side face 240*b*. Accordingly, adhesiveness between the resin portion 22 and the accommodating portion 240, and the water-proofing property of the stator unit 2 can be further improved.

In the second protrusion portion 242*b* and the second dent portion 243*b*, the first to fourth inner side faces R1 to R4 may be parallel to the radial direction or orthogonal to the radial direction. In other words, the axial face of the second stepped portions 241*b* may be parallel to the radial direction, or orthogonal to the radial direction. That is, the axial face of the second stepped portions 241*b* may be inclined relative to the central axis CA.

The stepped portions 241 are provided on both of the bottom face 240*a* and the inner side face 240*b* in the above-mentioned embodiment. However, the present invention is not limited to this embodiment, and the stepped portions 241 may be provided on one of the bottom face 240*a* and the inner side face 240*b*. That is, the plurality of stepped portions 241 only need to be provided on the bottom face 240*a* and/or the inner side face 240*b* of the accommodating portion 240. Then, the bottom face 240*a*, the inner side face 240*b*, and the stepped portions 241 are covered with the resin portion 22. Also in this case, the contact area between the accommodating portion 240 of the housing 24 and the resin portion 22 can be increased by providing the stepped portions 241 on the bottom face 240*a* and/or the inner side face 240*b* of the accommodating portion 240, which is covered with the resin portion 22, and covering the stepped portions 241 with the resin portion 22. Accordingly, adhesiveness of the resin portion 22 to the accommodating portion 240 can be improved, which makes moisture less likely to intrude between the resin portion 22 and the housing (the accommodating portion 240). Further, the distance with which moisture intrudes through the interface between the accommodating portion 240 of the housing 24 and the resin portion 22 filled in the accommodating portion 240 and reaches the stator 20 can be increased. Therefore, moisture is less likely to intrude into the stator 20, which can inhibit corrosion of the stator core 201 and so forth. Thus, the water-proofing property of the stator unit 2 can be improved.

The plurality of stepped portions 241 form both the protrusion portion 242 and the dent portion 243 in the above-mentioned embodiment. However, the present invention is not limited to this embodiment. The plurality of stepped portions 241 may form the protrusion portion 242 or the dent portion 243. Also in this case, the contact area between the accommodating portion 240 and the resin portion 22 can be further increased, and the distance with which moisture intrudes through the interface between the resin portion 22 and the accommodating portion 240 can be further increased. Accordingly, moisture is less likely to intrude into the stator 20.

Figure 7:
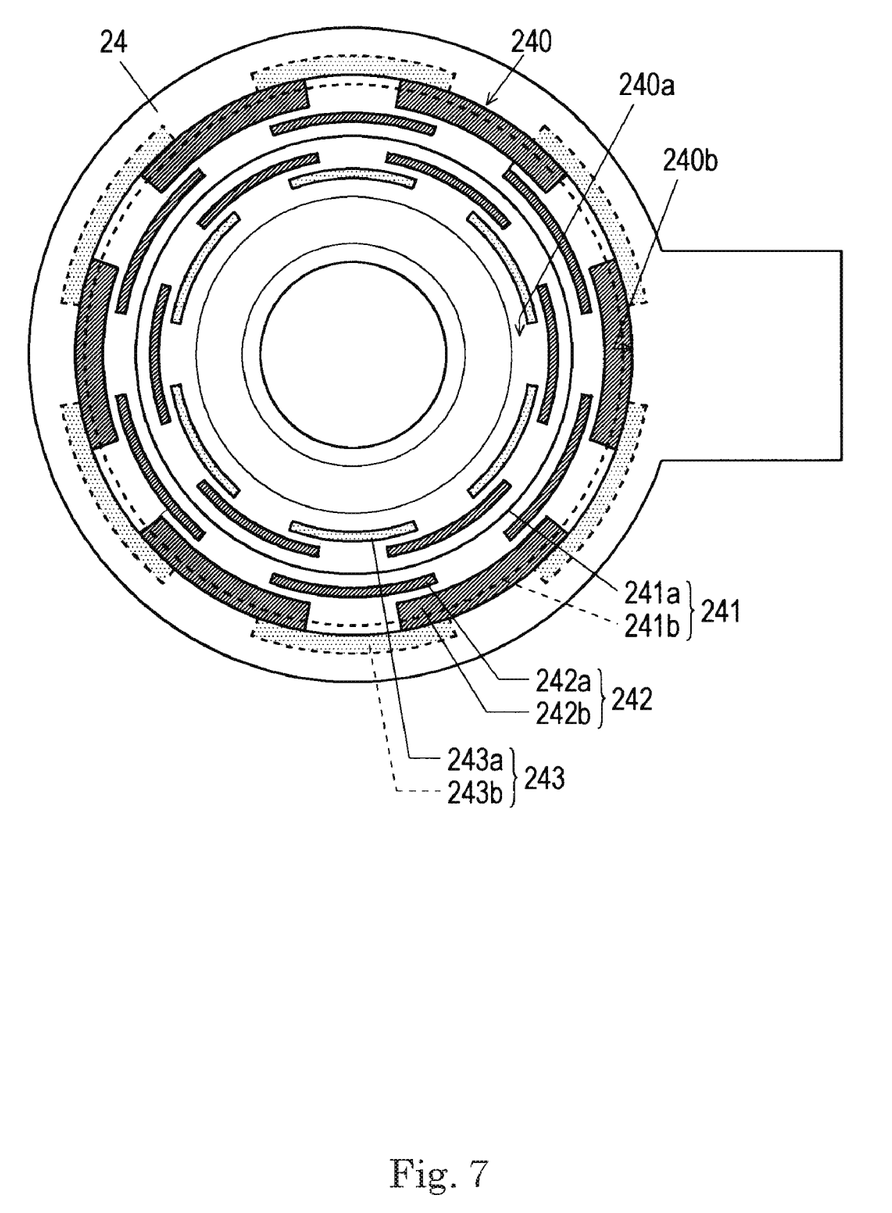
FIG. 7 is a top view illustrating a housing in accordance with a modification example.

The protrusion portion 242 and the dent portion 243 that are formed of the plurality of stepped portions 241 are annular in the above-mentioned embodiment. However, the present invention is not limited to this embodiment, and a plurality of protrusion portions 242 and dent portions 243 may be arranged in the circumferential direction. Specifically, as illustrated in FIG. 7, the plurality of protrusion portions 242 and/or the plurality of dent portions 243, which are formed of the plurality of stepped portions 241, may be arranged in the circumferential direction. More specifically, the first protrusion portions 242a, the first dent portions 243a, the second protrusion portions 242b, and/or the second dent portion 243b may be arranged in the circumferential direction. Thereby, the accommodating portion 240 provided with the stepped portions 241 can be easily designed. Further, when the first stepped portions 241a are provided, and the no second stepped portion 241b is provided, the accommodating portion 240 can be molded without using a mold of complicated shape.

The plurality of first stepped portions 241a form both of the first protrusion portion 242a and the first dent portion 243a in this embodiment and however, the present invention is not limited to this embodiment. The plurality of first stepped portions 241a may form the first protrusion portion 242a included in the protrusion portion 242 and/or the first dent portion 243a included in the dent portions 243. The first protrusion portion 242a and/or the first dent portion 243a is covered with the resin portion. Also, in this case, the first protrusion portion 242a and/or the first dent portion 243a can further increase the contact area between the accommodating portion 240 and the resin portion 22, and can increase the distance with which moisture intrudes through the interface between the resin portion 22 and the accommodating portion 240. Accordingly, moisture is less likely to intrude into the stator 20.

At this time, preferably, the first protrusion portion 242a and/or the first dent portion 243a is larger in the radial direction than in the axial direction. In this manner, more first protrusion portion 242a and/or first dent portion 243a that increases the contact area and the water-intrusion distance between the resin portion 22 and the accommodating portion 240 can be provided on the bottom face 240a of the accommodating portion 240. Accordingly, adhesiveness between the resin portion 22 and the accommodating portion 240, and the water-proofing property of the stator unit 2 can be further improved.

The plurality of second stepped portions 241b form both of the second protrusion portion 242b and the second dent portion 243b in this embodiment and however, the present invention is not limited to this embodiment. The plurality of second stepped portions 241b may form the second protrusion portion 242b included in the protrusion portion 242 and/or the second dent portion 243b included in the dent portion 243. The second protrusion portion 242b and/or the second dent portion 243b is covered with the resin portion 22. Also in this case, the second protrusion portion 242b and/or the second dent portion 243b can further increase the contact area between the accommodating portion 240 and the resin portion 22, and can further increase the distance with which moisture intrudes through the interface between the resin portion 22 and the accommodating portion 240. This makes moisture less likely to intrude into the stator 20.

At this time, preferably, the second protrusion portion 242b and/or the second dent portion 243b is larger in the radial direction than in the axial direction. In this manner, more second protrusion portion 242b and/or second dent portion 243b that increase the contact area and the water-intrusion distance between the resin portion 22 and the accommodating portion 240 can be provided on the inner side face 240b of the accommodating portion 240. Accordingly, adhesiveness between the resin portion 22 and the accommodating portion 240, and the water-proofing property of the stator unit 2 can be further improved.

For example, the motor 110 is the outer rotor-type motor in the above-mentioned embodiment and the modification example (See FIG. 1). However, the motor 110 is not limited to this, and may be an inner rotor-type motor. In the case of the inner rotor-type of motor 110, the magnet 12 of the rotor 1 is located inside of the stator 20 in the radial direction.

The present disclosure is useful for a motor having a stator unit in which a resin portion covers a stator and a housing.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator unit comprising:
   an annular stator, the center of which is positioned on a central axis;
   a housing including an accommodating portion that accommodates a part of a resin portion covering at least a part of the stator, wherein
   at least one of a bottom face of the accommodating portion oriented to the stator in an axial direction and an inner side face of the accommodating portion oriented to an inner side in a radial direction is provided with a plurality of stepped portions,
   the stepped portions provided in the bottom face are different from each other in length in the axial direction,
   the stepped portions provided in the inner side face are different from each other in length in the radial direction,
   the bottom face, the inner side face, and the stepped portion are covered with the resin portion,
   the stator unit further includes a base plate between the stator and the bottom face of the accommodating portion in the axial direction, and
   the stepped portion is located closer to the bottom face in the axial direction than the base plate is.

2. The stator unit according to claim 1, wherein the stepped portion is continuous annularly in a circumferential direction.

3. The stator unit according to claim 1, wherein
   a plurality of the stepped portions are provided, and
   the plurality of stepped portions form at least one of a protrusion portion and a dent portion.

4. The stator unit according to claim 3, wherein
   the stepped portions include first stepped portions provided on the bottom face of the accommodating portion and arranged in the radial direction,
   the plurality of first stepped portions form at least one of a first protrusion portion included in the protrusion portion and a first dent portion included in the dent portion, and
   the at least one of the first protrusion portion and the first dent portion is covered with the resin portion.

5. The stator unit according to claim 4, wherein the at least one of the first protrusion portion and the first dent portion is larger in the axial direction than in the radial direction.

6. The stator unit according to claim 4, wherein radial side faces of the first stepped portions are parallel to the central axis.

7. The stator unit according to claim 3, wherein
the stepped portions include a plurality of second stepped portions provided on the inner side face of the accommodating portion and arranged in the axial direction,
the plurality of second stepped portions form at least one of a second protrusion portion included in the protrusion portion and a second dent portion included in the dent portion, and
the at least one of the second protrusion portion and the second dent portion is covered with the resin portion.

8. The stator unit according to claim 7, wherein the at least one of the second protrusion portion and the second dent portion is larger in the radial direction than in the axial direction.

9. The stator unit according to claim 1, wherein
a plurality of the stepped portions are provided, and
the plurality of stepped portions form at least either protrusion portions or dent portions, and
the at least either of the protrusion portions or the dent portions are arranged in a circumferential direction.

10. The stator unit according to claim 1, wherein the base plate is located inside of the accommodating portion, and is covered with the resin portion.

11. A motor comprising:
a rotor rotatable about the central axis;
the stator unit according to claim 1, the stator unit driving the rotor; and
a bearing that is disposed in the stator unit and rotatably supports the rotor, wherein
the rotor includes a magnet inside or outside of the stator in the radial direction.

12. A fan motor comprising:
an impeller including a plurality of blades rotatable about a central axis; and
the motor according to claim 11, the motor rotating the impeller.

13. A stator unit comprising:
an annular stator, the center of which is positioned on a central axis;
a housing including an accommodating portion that accommodates a part of a resin portion covering at least a part of the stator, wherein
at least one of a bottom face of the accommodating portion oriented to the stator in an axial direction and an inner side face of the accommodating portion oriented to an inner side in a radial direction is provided with a plurality of stepped portions,
the stepped portions provided in the bottom face are different from each other in length in the axial direction,
the stepped portions provided in the inner side face are different from each other in length in the radial direction,
the bottom face, the inner side face, and the stepped portion are covered with the resin portion,
a plurality of the stepped portions are provided,
the plurality of stepped portions form at least one of a protrusion portion and a dent portion, and
the stepped portions include a plurality of second stepped portions provided on the inner side face of the accommodating portion and arranged in the axial direction,
the plurality of second stepped portions form at least one of a second protrusion portion included in the protrusion portion and a second dent portion included in the dent portion, and
the at least one of the second protrusion portion and the second dent portion is covered with the resin portion.

14. The stator unit according to claim 13, wherein the at least one of the second protrusion portion and the second dent portion is larger in the radial direction than in the axial direction.

* * * * *